May 5, 1931.  P. SAGEN  1,803,563
TIRE CHAIN CROSS MEMBER
Filed Feb. 21, 1928
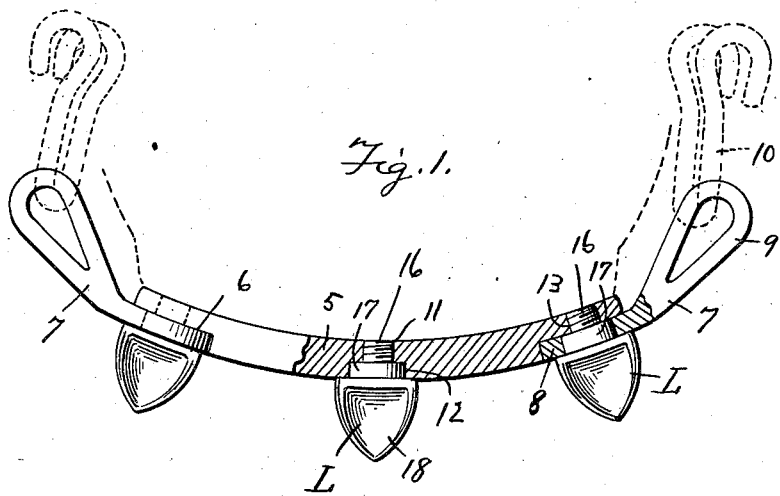
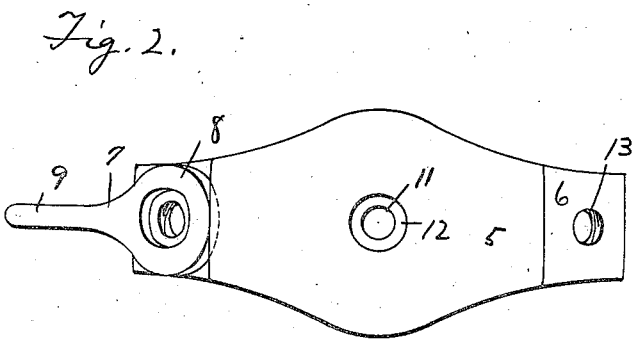
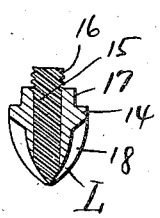
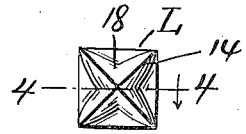
Inventor
Peter Sagen
By Clarence A O'Brien
Attorney Patented May 5, 1931

1,803,563

UNITED STATES PATENT OFFICE

PETER SAGEN, OF SKANEATELES, NEW YORK

TIRE-CHAIN CROSS MEMBER

Application filed February 21, 1928. Serial No. 255,964.

The present invention relates to a tire chain cross member and has for its prime object to provide a member of this nature which includes a plate having a plurality of detachable anti-skid and anti-slipping lugs formed with relatively hard centers so as to provide a constant pointed contact with the ground.

A further important object of the invention resides in the provision of a member of this nature which is exceedingly simple in its construction, strong and durable, inexpensive to manufacture, and thoroughly efficient and reliable in use.

In the drawing:

Figure 1 is a sectional elevation of one of the members embodying the features of my invention, Figure 2 is a plan view thereof, Figure 3 is an end view of one of the lugs, and Figure 4 is a sectional view therethrough taken substantially on the line 4—4 of Figure 3.

Referring to the drawing in detail it will be seen that the numeral 5 denotes an elongated plate curved longitudinally and provided with reduced ends to form recesses 6 on the bottom surfaces thereof. Numerals 7 denote links provided with ring portions 8 to be received in the recesses 6 and elongated loop portions 9 to be attached to links 10 for mounting the plates between the longitudinal chains, (not shown). The plate 5 is relatively wide at its center tapering toward its end. The center of the plate is provided with an opening 11 countersunk as at 12. The reduced ends are formed with openings 13.

A plurality of lugs L comprise body portions 14 with hardened center shanks 15 extending therethrough and threaded as at 16 for engagement in openings 11 and 13. The bodies adjacent the threaded portion 16 of the shank are reduced and rounded as at 17 to be received in the rings 8 and in the countersunk portions 12. The bodies taper toward their ends and are concaved inwardly as is indicated at 18. It will be seen that the lugs will wear faster on their body portions than at their center so as to always obtain a somewhat pointed contact for the ground.

It will also be seen that the end lugs engage the links 7 on the plates.

It is thought that the construction, operation, utility and advantages of this invention will now be quite apparent to those skilled in this art without a more detailed description thereof.

The present embodiment of the invention has been disclosed in detail merely by way of example since in actual practice it attains the features of advantage enumerated as desirable in the statement of the invention and the above description.

It will be apparent that changes in the details of construction may be resorted to without departing from the spirit or scope of the invention as hereinafter claimed or sacrificing any of its advantages.

Having thus described my invention, what I claim as new is:

A device of the character described comprising an oblong plate body, the ends of which have recessed end surfaces, holes in said respective recesses, companion link members having complemental openings and calks having shank portions adapted to pivotally connect said link members in the respective recess openings in oblong plate.

In testimony whereof I affix my signature.

PETER SAGEN.